(12) United States Patent
Shiga et al.

(10) Patent No.: US 9,707,917 B2
(45) Date of Patent: Jul. 18, 2017

(54) VEHICLE SEAT

(71) Applicants: TOYOTA JIDOSHA KABUSHIKI KAISHA, Toyota-shi, Aichi (JP); TOYOTA BOSHOKU KABUSHIKI KAISHA, Kariya-shi, Aichi (JP)

(72) Inventors: Kazuyuki Shiga, Nisshin (JP); Hiroki Yamano, Kariya (JP); Jouji Adachi, Toyota (JP); Takahiro Yasuda, Toyota (JP)

(73) Assignees: TOYOTA JIDOSHA KABUSHIKI KAISHA, Toyota (JP); TOYOTA BOSHOKU KABUSHIKI KAISHA, Kariya-shi (JP)

(*) Notice: Subject to any disclaimer, the term of this patent is extended or adjusted under 35 U.S.C. 154(b) by 0 days.

(21) Appl. No.: 15/039,162

(22) PCT Filed: Nov. 27, 2014

(86) PCT No.: PCT/JP2014/081419
§ 371 (c)(1),
(2) Date: May 25, 2016

(87) PCT Pub. No.: WO2015/080213
PCT Pub. Date: Jun. 4, 2015

(65) Prior Publication Data
US 2017/0101072 A1    Apr. 13, 2017

(30) Foreign Application Priority Data
Nov. 27, 2013  (JP) .................................. 2013-245316

(51) Int. Cl.
*B60R 21/207* (2006.01)
*B60N 2/68* (2006.01)
(Continued)

(52) U.S. Cl.
CPC .............. *B60R 21/207* (2013.01); *B60N 2/68* (2013.01); *B60R 21/23138* (2013.01); *B60N 2002/5808* (2013.01); *B60R 2021/23146* (2013.01)

(58) Field of Classification Search
CPC ............ B60R 21/207; B60R 21/23138; B60R 2021/23146; B60N 2/68; B60N 2002/5808
See application file for complete search history.

(56) References Cited

U.S. PATENT DOCUMENTS

| | | | |
|---|---|---|---|
| 5,810,389 A | 9/1998 | Yamaji et al. | |
| 5,893,579 A * | 4/1999 | Kimura | B60N 2/5825 280/728.3 |

(Continued)

FOREIGN PATENT DOCUMENTS

| | | |
|---|---|---|
| EP | 2878496 A1 | 6/2015 |
| JP | H08-225052 A | 9/1996 |

(Continued)

*Primary Examiner* — Drew J Brown
(74) *Attorney, Agent, or Firm* — Oliff PLC

(57) ABSTRACT

A vehicle seat includes a side airbag device that includes an inflator and a bag body that inflates in a case in which the bag body is internally supplied with gas generated by the inflator, a side frame to which the side airbag device is attached, and a seatback pad that is attached to the side frame. The seatback pad is provided with an opening through which the inflating bag body passes, and a door that closes off the opening and that is pushed and swung by the inflating bag body so as to open up the opening. A depression is formed on a swing axis side of the door.

13 Claims, 6 Drawing Sheets

(51) Int. Cl.
*B60R 21/231* (2011.01)
*B60N 2/58* (2006.01)

(56) References Cited

U.S. PATENT DOCUMENTS

| | | |
|---|---|---|
| 5,988,674 A | 11/1999 | Kimura et al. |
| 5,997,032 A | 12/1999 | Miwa et al. |
| 6,003,939 A | 12/1999 | Nakai et al. |
| 6,089,594 A | 7/2000 | Hasegawa et al. |
| 6,450,528 B1 | 9/2002 | Suezawa et al. |
| 6,561,540 B1 | 5/2003 | Hasegawa et al. |
| 9,067,558 B2 * | 6/2015 | Akiyama ............... B60R 21/207 |
| 9,283,914 B2 * | 3/2016 | Fujiwara ............... B60R 21/207 |
| 9,393,893 B2 * | 7/2016 | Kozaki ................... B60N 2/58 |
| 9,409,540 B2 * | 8/2016 | Fujiwara ............... B60R 21/207 |
| 9,616,791 B2 * | 4/2017 | Awata ..................... B60N 2/64 |
| 2009/0315305 A1 | 12/2009 | Evans et al. |
| 2012/0043791 A1 | 2/2012 | Kojima |
| 2014/0183846 A1 | 7/2014 | Fujiwara et al. |
| 2014/0312664 A1 * | 10/2014 | Tanabe ................. B60R 21/207 297/216.13 |
| 2015/0151711 A1 * | 6/2015 | Fujiwara ............... B60R 21/207 280/728.2 |
| 2016/0101760 A1 * | 4/2016 | Fujiwara ............... B60R 21/261 280/728.3 |
| 2016/0167611 A1 * | 6/2016 | Fujiwara ............... B60R 21/207 297/216.13 |

FOREIGN PATENT DOCUMENTS

| | | |
|---|---|---|
| JP | H08-258660 A | 10/1996 |
| JP | H09-76859 A | 3/1997 |
| JP | H09-254735 A | 9/1997 |
| JP | H10-76084 A | 3/1998 |
| JP | H10-129382 A | 5/1998 |
| JP | H10-250522 A | 9/1998 |
| JP | 2000-085517 A | 3/2000 |
| JP | 2000-168485 A | 6/2000 |
| JP | 2001-130360 A | 5/2001 |
| JP | 2010-095019 A | 4/2010 |
| JP | 2010-184668 A | 8/2010 |
| JP | 5292970 B2 | 9/2013 |
| JP | 2013-203368 A | 10/2013 |
| WO | 2010/131322 A1 | 11/2010 |
| WO | 2013/014800 A1 | 1/2013 |

* cited by examiner

VEHICLE SEAT

TECHNICAL FIELD

The present invention relates to a vehicle seat provided with a side airbag device.

BACKGROUND ART

Japanese Patent Application Laid-Open (JP-A) No. H09-76859 describes a vehicle seat in which a side airbag device is provided at a side section of a seatback. Explained briefly, in the technology described in this document, a side frame configuring part of a seatback frame is formed with a recess in which an inflator and a bag body configuring the side airbag device are stowed, and a seatback pad is attached to the side frame. The side airbag device is thus disposed between the side frame and the seatback pad. As viewed from a side of the seat, a slit forming three sides of a rectangle is formed in the seatback pad at a location at a side of the seat from the side airbag device. Deployment of the bag body to the side of the seat can accordingly be facilitated during actuation of the side airbag device, namely in a case in which gas generated by the inflator is supplied inside the bag body.

SUMMARY OF INVENTION

Technical Problem

The technology described in JP-A No. H09-76859 is useful technology in the respect that it can facilitate deployment of the bag body of the side airbag device to the side of the seat. However, there is room for improvement from the perspective of deploying the bag body of the side airbag device to the side of the seat rapidly.

In consideration of the above circumstances, an object of the present invention is to obtain a vehicle seat capable of rapidly deploying a bag body of a side airbag device to the side of a seat.

Solution to Problem

A vehicle seat according to a first aspect includes: a side airbag device that includes an inflator and a bag body that inflates in a case in which the bag body is internally supplied with gas generated by the inflator; a side frame that is provided extending in a seat up-down direction at a seat width direction outside end portion inside a seatback, and that includes an attached-to portion to which the side airbag device is attached; and a seatback pad that covers the side airbag device attached to the attached-to portion from a seat front side, a seat width direction outside, and a seat rear side, and that includes an opening through which the inflating bag body passes, a door that closes off the opening and that is pushed and swung by the inflating bag body so as to open up the opening, and a weakened portion formed along the door on a swing axis side of the door.

In the vehicle seat according to the first aspect, the bag body inflates in a case in which the side airbag device attached to the side frame actuates, namely in a case in which gas generated by the inflator is supplied inside the bag body. The inflating bag body pushes back the door provided at the seatback pad and passes through the opening provided at the seatback pad. The bag body accordingly deploys to the side of the seat. Note that the weakened portion is formed at the seatback pad on the swing axis side of the door, such that stress concentrates at the weakened portion in a case in which the door is pressed by the inflating bag body. In other words, the door swings under a smaller pressing force as a result of including the weakened portion. The vehicle seat accordingly enables rapid deployment of the bag body of the side airbag device to the side of the seat.

A vehicle seat according to a second aspect is the vehicle seat of the first aspect, wherein: the seatback pad includes a side support section projecting out toward the seat front side at a seat front side of the side airbag device that is attached to the attached-to portion, a side wall section extending from a seat width direction end portion of the side support section toward the seat rear side, and a rear wall section extending from a seat rear side end portion of the side wall section toward the seat width direction inside at the seat rear side of the side airbag device; a slit forming an inner edge of the opening and forming an outer edge of the door is formed at the side wall section; and the weakened portion is formed at a boundary between the side wall section and the rear wall section.

In the vehicle seat according to the second aspect, the inflating bag body deploys to the side of the seat from the side wall section disposed at the rear side of the side support section and at the front side of the rear wall section. Moreover, in the vehicle seat, the side wall section can be formed with the opening through which the inflating bag body passes and the door that closes off the opening by the simple configuration of forming the slit to the side wall section. In addition, forming the weakened portion at the boundary between the side wall section and the rear wall section, namely at a bending or curving location, enables the door to be swung under a smaller pressing force.

A vehicle seat according to a third aspect is the vehicle seat of the second aspect, wherein: the slit is configured to include a first slit extending in the seat up-down direction, a second slit extending from a seat upper side end of the first slit toward the seat rear side, and a third slit extending from a seat lower side end of the first slit toward the seat rear side; and a seat rear side end of the second slit and a seat rear side end of the third slit are positioned at the boundary between the side wall section and the rear wall section.

In the vehicle seat according to the third aspect, the first slit, the second slit, and the third slit form the rectangular shaped opening through which the inflating bag body passes, and the rectangular shaped door that closes off the opening, in the side wall section. This thereby enables the door to be swung about a swing axis at the rear end of the second slit and the rear end of the third slit under a smaller pressing force.

A vehicle seat according to a fourth aspect is the vehicle seat of the third aspect, wherein the position of the second slit and the position of the third slit are respectively positioned further to the seat upper side and further to the seat lower side than the side airbag device as viewed from a side of the seat.

The vehicle seat according to the fourth aspect enables the second slit and the third slit that respectively form an upper edge and a lower edge of the opening to be suppressed from getting in the way of the bag body in a case in which the inflating bag body passes through the opening. This thereby enables improved deployment performance of the inflating bag body in the seat up-down direction.

A vehicle seat according to a fifth aspect is the vehicle seat of any one of the second aspect to the fourth aspect, wherein: a sheet shaped member that is harder than the seatback pad is attached to a seat inside face of the rear wall section, and an end of the sheet shaped member is positioned at the boundary between the side wall section and the rear wall section.

In the vehicle seat according to the fifth aspect, attaching the sheet shaped member to the seat inside face of the rear wall section creates a rigidity difference at the boundary between the side wall section and the rear wall section. This thereby enables deformation to occur more readily at the boundary between the rear wall section and the side wall section, namely at the location of the rigidity difference, in a case in which the side wall section and the rear wall section are pressed by the inflating bag body. This thereby enables the door to swing under a smaller pressing force.

A vehicle seat according to a sixth aspect is the vehicle seat of the fifth aspect, wherein: the rear wall section includes an oblique portion extending in the seat width direction at the seat rear side of the side airbag device, and a leading end portion extending from a seat width direction inside end portion of the oblique portion along a seat rear side end portion of the side frame, and the sheet shaped member is attached to a face at a seat inside of the oblique portion and of the leading end portion.

The vehicle seat according to the sixth aspect enables improved shape retention of the oblique portion and the leading end portion of the rear wall section, while securing cushioning properties in a case in which the oblique portion and the leading end portion of the rear wall section are contacted from seat outside.

A vehicle seat according to a seventh aspect is the vehicle seat of the sixth aspect, wherein: the side airbag device is configured including a base that supports the inflator and the bag body; and a seat width direction inside end portion of the sheet shaped member abuts the side frame, and a seat width direction outside end portion of the sheet shaped member abuts the base.

In the vehicle seat according to the seventh aspect, the oblique portion and the leading end portion of the rear wall section abut the side frame and the base, thereby enabling deformation of the oblique portion and the leading end portion of the rear wall section to be suppressed.

A vehicle seat according to an eighth aspect is the vehicle seat of any one of the first aspect to the seventh aspect, wherein: a seat up-down direction dimension of the opening is set larger than a seat up-down direction dimension of the side airbag device attached to the attached-to portion; and an upper edge and a lower edge of the opening are respectively positioned further to the seat upper side and further to the seat lower side than the side airbag device attached to the attached-to portion.

The vehicle seat according to the eighth aspect enables the upper edge and the lower edge of the opening to be suppressed from getting in the way of the bag body in a case in which the inflating bag body passes through the opening. This thereby enables improved deployment performance of the inflating bag body in the seat up-down direction.

A vehicle seat according to a ninth aspect is the vehicle seat of any one of the first aspect to the eighth aspect, wherein, as viewed from a side of the seat, a front edge of the opening is at the same position as a front end of the bag body in a stowed state of the bag body, or is positioned further to the seat front side than the front end of the bag body in the stowed state.

The vehicle seat according to the ninth aspect enables the front edge of the opening to be suppressed from getting in the way of the bag body in a case in which the inflating bag body passes through the opening. This thereby enables improved deployment performance of the inflating bag body toward an oblique front side of the seat.

A vehicle seat according to a tenth aspect is the vehicle seat of any one of the second aspect to the ninth aspect, wherein a hardness of the side support section is set higher than a hardness of the side wall section.

In the vehicle seat according to the tenth aspect, the side support section deforms less readily than the side wall section in a case in which the inflating bag body presses the side support section and the side wall section. The bag body pressing the side support section and the side wall section thereby inflates toward the seat width direction outside. This thereby enables earlier deployment of the bag body toward the seat width direction outside.

A vehicle seat according to an eleventh aspect is the vehicle seat of any one of the first aspect to the tenth aspect, wherein: the seatback pad is covered by a covering material; the covering material is provided with a splitting stitched portion that splits in a case in which the covering material is pressed by the inflating bag body; a reinforcement sheet with a greater tensile strength than the covering material is attached to the covering material in a state straddling a portion of the splitting stitched portion; and one end of the reinforcement sheet is fixed to the seatback pad.

In the vehicle seat according to the eleventh aspect, in a case in which the covering material is pressed by the inflating bag body, stress concentrates at a boundary portion between the splitting stitched portion provided at the covering material and the reinforcement sheet, such that the splitting stitched portion can be split originating at the location where stress concentrates. Namely, the vehicle seat enables early deployment of the bag body.

A vehicle seat according to a twelfth aspect is the vehicle seat of the eleventh aspect, wherein: the covering material is configured to include a main section cover that covers a main section configuring part of the seatback pad and is disposed between the side support sections respectively disposed at each seat width direction end portion of the seatback pad, a side support section cover that covers a seat front side face of the side support section, and a sidepiece side cover that covers from a seat width direction outside face of the side support section to outside portions of the side wall section and the rear wall section; the splitting stitched portion is disposed at a location where the side support section cover and the sidepiece side cover are stitched together; the reinforcement sheet is configured by a first reinforcement sheet and a second reinforcement sheet that are respectively stitched to the side support section cover and the sidepiece side cover in a state extending along a face on the seatback pad side of each of the side support section cover and the sidepiece side cover, and the first reinforcement sheet and the second reinforcement sheet are stitched together at the splitting stitched portion; and the first reinforcement sheet is stitched to the main section cover and the side support section cover in a state in which one end of a coupling member coupled to the seatback pad is interposed between the main section cover and the side support section cover.

In the vehicle seat according to the twelfth aspect, in a case in which the covering material is pressed by the inflating bag body, stress concentrates at the stitched portion (splitting stitched portion) between the side support section cover and the sidepiece side cover, and a boundary portion between the first reinforcement sheet and the second reinforcement sheet, such that the splitting stitched portion splits, originating at where stress concentrates. Namely, the vehicle seat enables early deployment of the bag body. The vehicle seat moreover enables the covering material to be supported by the seatback pad due to coupling the coupling member to the seatback pad.

A vehicle seat according to a thirteenth aspect is the vehicle seat of either the eleventh aspect, or the twelfth aspect, when including the configuration of the third aspect, wherein the reinforcement sheet and the first slit are disposed overlapping with each other in the seat width direction as viewed from the side of the seat.

In the vehicle seat according to the thirteenth aspect, in a case in which the covering material is pressed by the inflating bag body, stress concentrates at a boundary portion between the covering material and the reinforcement sheet. Moreover, the first slit forming the front edge of the door through which the inflating and deploying bag body passes is disposed overlapping with the reinforcement sheet, thereby enabling stress arising at the boundary portion between the covering material and the reinforcement sheet to be further increased. This thereby enables early deployment of the bag body.

A vehicle seat according to a fourteenth aspect is the vehicle seat of the twelfth aspect, wherein a location where the main section cover and the side support section cover are stitched together is coupled through the coupling member and a hog ring to an insert wire insert molded to the seatback pad.

In the vehicle seat according to the fourteenth aspect, coupling the coupling member to the insert wire through the hog ring enables easy attachment of the covering material to the seatback pad.

Advantageous Effects of Invention

The vehicle seat according to the present invention exhibits the excellent advantageous effect of enabling rapid deployment of the bag body of the side airbag device to the side of the seat.

DESCRIPTION OF EMBODIMENTS

First Exemplary Embodiment

Figure 1:
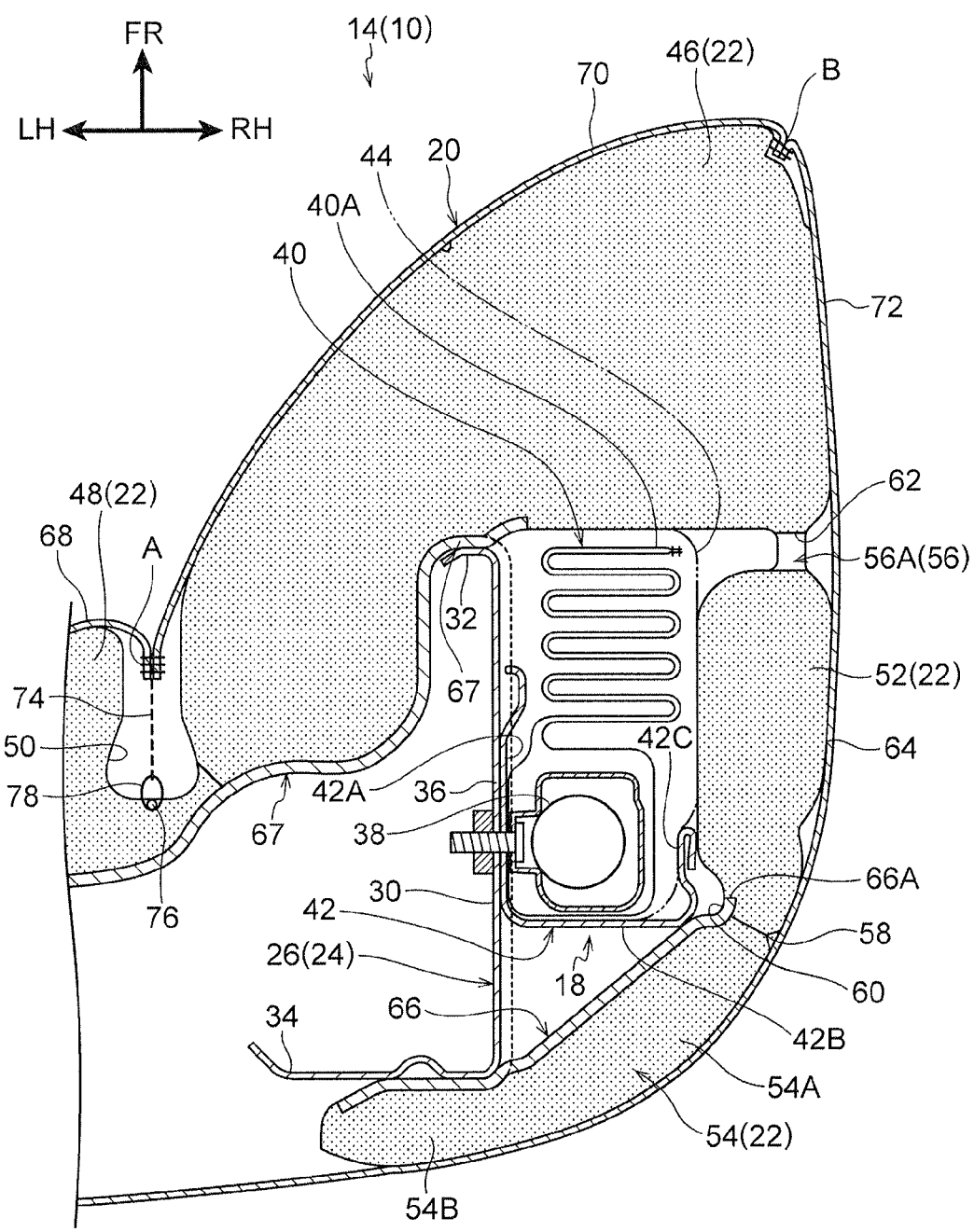
FIG. 1 is an enlarged cross-section taken along line 1-1 in FIG. 2, illustrating a cross-section of a seat width direction end portion of a vehicle seat according to a first exemplary embodiment.
Figure 2:
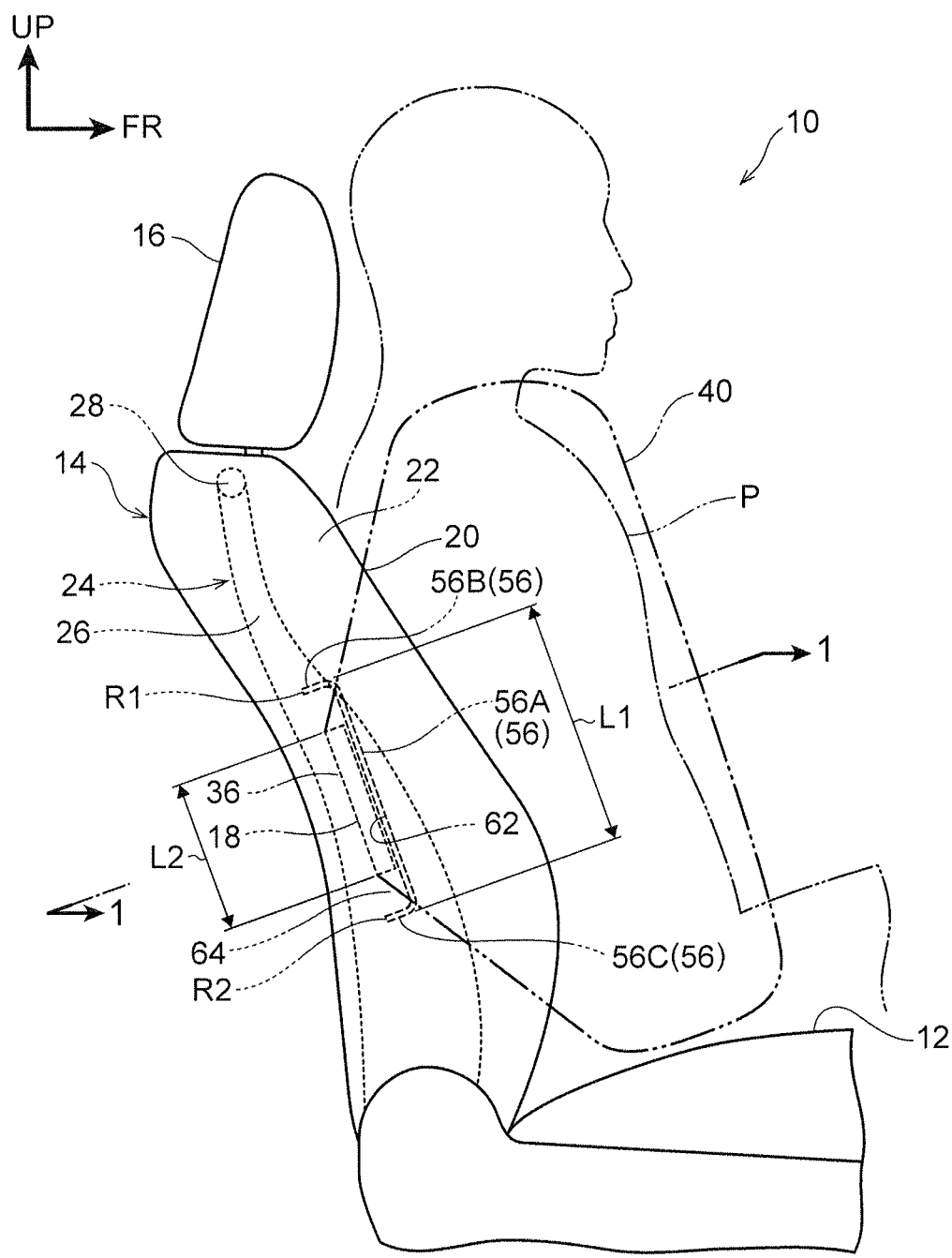
FIG. 2 is a side view illustrating a vehicle seat according to the first exemplary embodiment, as viewed from the side of the seat.

Explanation follows regarding a vehicle seat according to a first exemplary embodiment of the present invention, with reference to FIG. 1 and FIG. 2. Note that in the following explanation, reference to the front, rear, left, right, upward, and downward directions refers to the front, rear, left, right, upward, and downward directions as seen by an occupant sitting in the vehicle seat. In each of the drawings, the arrow FR indicates the front direction, the arrow UP indicates the upward direction, the arrow RH indicates the right direction, and the arrow LH indicates the left direction, as appropriate. The arrow RH and the arrow LH correspond to the seat width direction.

As illustrated in FIG. 2, a vehicle seat 10 of the present exemplary embodiment is employed as a driving seat in what is referred to as a right-hand drive vehicle. The vehicle seat 10 includes a seat cushion 12 that supports the buttocks and thighs of an occupant P, a seatback 14 that supports the back of the occupant P, and a headrest 16 that supports the head of the occupant P. A side airbag device 18 is provided inside the seatback 14.

The seatback 14 is attached to a rear end portion of the seat cushion 12 so as to be capable of reclining, and the seatback 14 is configured by attaching a seatback pad 22 covered by a covering material 20 to a seatback frame 24.

The seatback frame 24 configures framework of the seatback 14, and includes a pair of side frames 26 extending in the seat up-down direction at seat width direction right side and left side ends inside the seatback 14, and an upper frame 28 joining between upper ends of the pair of side frames 26 in the seat width direction. As illustrated in FIG. 1, each of the side frames 26 is formed with a substantially U-shaped cross-section opening toward the seat width direction inside in plan view of the seat. Each side frame 26 includes a general portion 30 extending in the seat up-down direction with its plate thickness direction along the seat width direction, a front side flange portion 32 extending from a front end of the general portion 30 toward the seat width direction inside, and a rear side flange portion 34 extending from a rear end of the general portion 30 toward the seat width direction inside and set with a longer dimension in the seat width direction than the front side flange portion 32. An up-down direction intermediate portion of the general portion 30 configures an attached-to portion 36 to which the side airbag device 18 is attached. The side airbag device 18 is fixed to a seat width direction outside face of the attached-to portion 36 by nuts and bolts or the like.

The side airbag device 18 includes an inflator 38 that generates gas, a bag body 40 that inflates after internally supplied with gas generated by the inflator 38, and a base (case) 42 that supports the inflator 38 and the bag body 40. The base 42 is formed with a substantially J-shaped cross-section opening toward the seat front side in plan view of the seat. The base 42 includes a fixing portion 42A that extends along the attached-to portion 36 of the side frame 26 and that is fixed to the attached-to portion 36, a first extension portion 42B extending from a rear end of the fixing portion 42A toward the seat width direction outside, and a second extension portion 42C extending from a seat width direction outside end of the first extension portion 42B toward the seat front side. The inflator 38 is disposed in a region enclosed by the fixing portion 42A, the first extension portion 42B, and the second extension portion 42C of the base 42, and the inflator 38 is supported by the fixing portion 42A. As the bag body 40, two sheets of a cloth that does not allow gas to permeate readily are formed into a bag shape by stitching together outer peripheral portions, or are formed into a bag shape by weaving with stitch-free outer peripheral portions. When inflated and deployed, the bag body 40 has a substantially rectangular shape as viewed from the side of the seat. A gas supply portion side of the bag body 40, namely the inflator 38 side of the bag body 40, is supported by the fixing portion 42A of the base 42, and the bag body 40 is stowed in a housed state folded up into a predetermined shape. Note that a covering member 44 that covers the bag body 40 in the stowed state is attached to the base 42. The covering member 44 splits easily after pressed by the inflating bag body 40.

The seatback pad 22 is formed by injecting a foamable resin material such as a polyurethane resin inside a predetermined mold and foaming in the mold. The seatback pad 22 includes side support sections 46 respectively disposed at both end portions in the seat width direction, and a main section 48 disposed between the pair of side support sections 46. The side support sections 46 are formed projecting out to the seat front side of the main section 48, thereby suppressing seat width direction movement of the occupant P seated in the vehicle seat 10. Boundaries between the side support sections 46 and the main section 48 are formed with recessed grooves 50 that open toward the seat front side.

The seatback pad 22 includes a side wall section 52 extending from a seat width direction end portion of the side support section 46 toward the seat rear side, and a rear wall section 54 extending from a seat rear side end portion of the side wall section 52 toward the seat width direction inside. In an attached state of the seatback pad 22 to the seatback frame 24, the side airbag device 18 is covered by the side support section 46, the side wall section 52, and the rear wall section 54 of the seatback pad 22. In the present exemplary embodiment, the density of the side support section 46 is set higher than the density of the side wall section 52 and the rear wall section 54, such that the hardness of the side support section 46 is higher than the hardness of the side wall section 52 and the rear wall section 54.

As illustrated in FIG. 2, the side wall section 52 is formed with a slit 56 with edge portions forming a substantially U-shape (a shape forming three sides of a rectangle) opening toward the seat rear side. The slit 56 is configured including a first slit 56A extending in the seat up-down direction, and a second slit 56B and third slit 56C respectively extending from an upper end and a lower end of the first slit 56A toward the seat rear side. Rear ends R1 and R2 of the second slit 56B and the third slit 56C are respectively positioned at a boundary between the side wall section 52 and the rear wall section 54. As illustrated in FIG. 1, the boundary between the side wall section 52 and the rear wall section 54 is formed with depressions 58, 60, serving as weakened portions, joining between the rear end R1 of the second slit 56B and the rear end R2 of the third slit 56C in the seat up-down direction. In the present exemplary embodiment, the depression 58 and the depression 60 are respectively formed on the seat width direction outside and the seat width direction inside of the boundary between the side wall section 52 and the rear wall section 54.

As illustrated in FIG. 2, forming the side wall section 52 with the slit 56 forms a substantially rectangular shaped opening 62, and a door 64 that closes off the opening 62. More specifically, the first slit 56A, the second slit 56B, and the third slit 56C form outer edges of the door 64, and as illustrated in FIG. 1 and FIG. 2, the side wall section 52 is formed with the substantially rectangular shaped opening 62 by the door 64 swinging about a swing axis at the boundary between the side wall section 52 and the rear wall section 54. Note that the first slit 56A, the second slit 56B, the third slit 56C, and a base end side (swing axis side) of the door 64 form inner edges of the opening 62.

As illustrated in FIG. 2, a seat up-down direction dimension L1 of the opening 62 is set larger than a seat up-down direction dimension L2 of the side airbag device 18 attached to the attached-to portion 36 of the side frame 26. The respective positions of the second slit 56B and the third slit 56C that form an upper edge and a lower edge of the opening 62 are positions further to the seat upper side and to the seat lower side than the side airbag device 18, such that they do not get in the way of the bag body 40 in an unrestrained deployed state. Note that the unrestrained deployed state of the bag body 40 refers to a state in which the bag body 40 is not in contact with the occupant P. Moreover, as illustrated in FIG. 1, the position of the first slit 56A forming a front edge of the opening 62 is positioned at substantially the same position as a front end 40A of the bag body 40 in the stowed state as viewed from the side of the seat.

The rear wall section 54 of the seatback pad 22 includes an oblique portion 54A extending in the seat width direction at a seat rear side of the side airbag device 18, and a leading end portion 54B extending along the rear side flange 34 of the side frame 26 from a seat width direction inside end portion of the oblique portion 54A. A back face member 66 serving as a sheet shaped member formed from a harder material than the rear wall sections 54 and the side wall sections 52 of the seatback pad 22 is attached to seat inside faces of the oblique portion 54A and the leading end portion 54B, namely seat front side (side frame 26 side) faces of the oblique portion 54A and the leading end portion 54B. As a specific example, the back face member 66 is a nonwoven fabric impregnated with a resin. An end portion 66B on the seat width direction inside of the back face member 66 abuts the rear side flange 34 of the side frame 26, and an end portion on the seat width direction outside of the back face member 66 abuts the first extension portion 42B of the base 42. An end 66A on the seat width direction outside of the back face member 66 is positioned at the boundary between the side wall section 52 and the rear wall section 54.

A back face member 67 formed from a similar nonwoven fabric to the back face member 66 is also attached to a seat inside face from the main section 48 to the side support section 46 of the seatback pad 22. An end portion 67A on the vehicle width direction outside of the back face member 67 is positioned at a seat width direction intermediate portion of the side support section 46, and the end portion 67A on the vehicle width direction outside of the back face member 67 abuts the front side flange portion 32 of the side frame 26.

The covering material 20 covering the seatback pad 22 is made from fabric or leather. In the present exemplary embodiment, the covering material 20 is formed by appropriately stitching together a main section cover 68, side support section covers 70, and sidepiece side covers 72 that have been cut into appropriate shapes. Specifically, a seat width direction outside end portion of the main section cover 68 that covers a seat front side face of the main section 48 is stitched to a seat width direction inside end portion of the side support section cover 70 that covers a seat front side face of the side support section 46. One end of a coupling member (suspension cloth) 74 is stitched to this stitching location A, and the other end of the coupling member 74 is coupled using hog rings 78 to an insert wire 76 integrally provided at the seatback pad 22 at the position of the recessed groove 50 by insert molding. A front end portion of the sidepiece side cover 72 that covers from a seat width direction outside face of the side support section 46 to outside portions of the side wall section 52 and the rear wall section 54 is stitched to a seat width direction outside end portion of the side support section cover 70 at a stitching location B configuring a splitting stitched portion B that splits accompanying actuation of the side airbag device 18.

Operation and Advantageous Effects of the Present Exemplary Embodiment

Next, explanation follows regarding operation and advantageous effects of the present exemplary embodiment.

Figure 3:
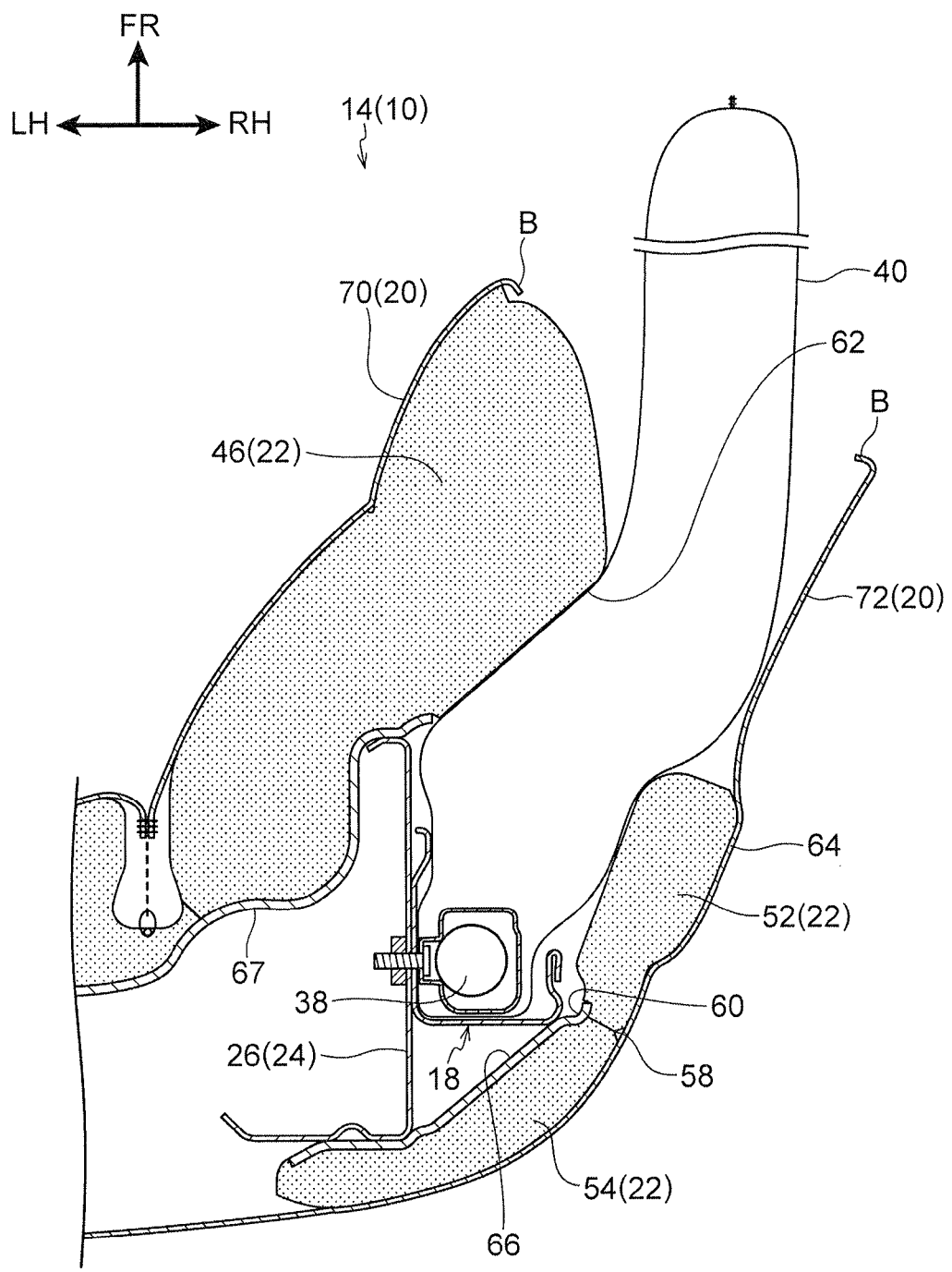
FIG. 3 is an enlarged cross-section corresponding to FIG. 1, illustrating the seat width direction end portion after actuation of a side airbag device.

As illustrated in FIG. 1, in a case in which the side airbag device 18 attached to the side frame 26 actuates in the event of a vehicle emergency (for example in the event of a collision), namely in a case in which gas generated by the inflator 38 is supplied into the bag body 40, the bag body 40 inflates. As illustrated in FIG. 3, the inflating bag body 40 pushes back the door 64 provided at the side wall section 52 of the seatback pad 22, and passes through the opening 62 provided in the side wall sections 52 and splits the covering material 20, originating at the splitting stitched portion B. The bag body 40 thereby deploys to the side of the seat.

Note that the swing axis side of the door 64 of the seatback pad 22 is formed with the depressions 58, 60, such that stress concentrates at the depressions 58, 60 in a case in which the door 64 is pressed by inflating bag body 40. In other words, the door swings under a smaller pressing force as a result of providing the depressions 58, 60. This thereby enables faster deployment of the bag body 40 of the side airbag device 18 to the side of the seat as a result.

In the present exemplary embodiment, the side wall section 52 can be formed with the opening 62 and the door 64 that closes off the opening 62 by the simple configuration of forming the slit 56 to the side wall section 52. Moreover, forming the depressions 58, 60 at the boundary between the side wall section 52 and the rear wall section 54, namely to a location where the seatback pad 22 curves, enables the door 64 to swing under a smaller pressing force.

Moreover, in the present exemplary embodiment, attaching the back face member 66 to the rear wall section 54 creates a rigidity difference at the boundary between the rear wall section 54 and the side wall section 52. This thereby enables deformation to occur more readily originating at the boundary between the rear wall section 54 and the side wall section 52, namely at the location of the rigidity difference (enables stress to be concentrated at the location of the rigidity difference). This thereby enables the door 64 to swing under a smaller pressing force.

Moreover, in the present exemplary embodiment, the positions of the second slit 56B and the third slit 56C that respectively form the upper edge and the lower edge of the opening 62 are set at the positions described above with respect to the side airbag device 18, such that they do not to get in the way of the bag body 40 in the unrestrained deployed state. This thereby enables improved deployment performance of the inflating bag body 40 in the seat up-down direction.

In the present exemplary embodiment, the hardness of the side support section 46 positioned at the vehicle front of the side airbag device 18 is set higher than the hardness of the side wall section 52 and the rear wall section 54. Accordingly, in a case in which the inflating bag body 40 presses the side support section 46, the side wall section 52, and the rear wall section 54, the side support section 46 deforms less readily than the side wall section 52 and the rear wall section 54. The bag body 40 pressing against the side support section 46, the side wall section 52, and the rear wall section 54 accordingly inflates toward the seat width direction outside. This thereby enables earlier deployment of the bag body 40 toward the seat width direction outside.

Note that in the present exemplary embodiment, explanation has been given regarding an example in which the hardness of the side support section 46 is set higher than the hardness of the side wall section 52 and the rear wall section 54. However, the present invention is not limited thereto. It is sufficient that the hardness of the side support section 46 is set appropriately, in consideration of the support performance of the occupant P, the deployment speed of the bag body 40, and the like.

Moreover, in the present exemplary embodiment, explanation has been given regarding an example in which the upper edge and the lower edge of the opening 62 are set at the positions described above. However, the present invention is not limited thereto. It is sufficient that the positions of the upper edge and the lower edge of the opening 62 are set appropriately, in consideration of the deployment speed of the bag body 40 and the like.

Moreover, in the present exemplary embodiment, explanation has been given regarding an example in which the depressions 58, 60 are formed on the swing axis side of the door 64 so as to facilitate swinging of the door 64. However, the present invention is not limited thereto. For example, in place of the depressions 58, 60, cut-out holes or the like may be formed as weakened portions so as to facilitate swinging of the door 64 by concentrating stress in the vicinity of the cut-out holes or the like.

Second Exemplary Embodiment

Figure 4:
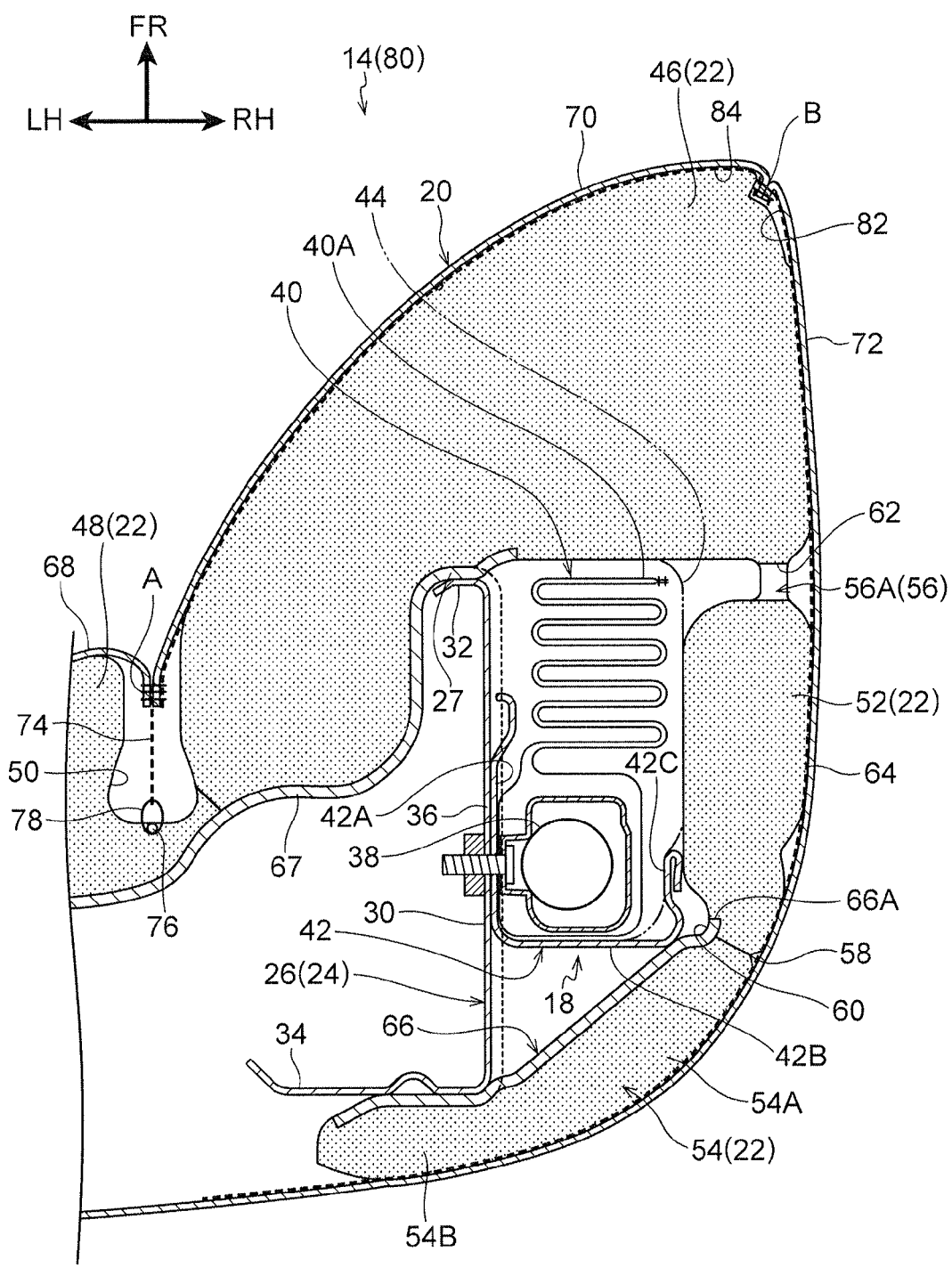
FIG. 4 is an enlarged cross-section taken along line 4-4 in FIG. 5, illustrating a cross-section of a seat width direction end portion of a vehicle seat according to a second exemplary embodiment.
Figure 5:
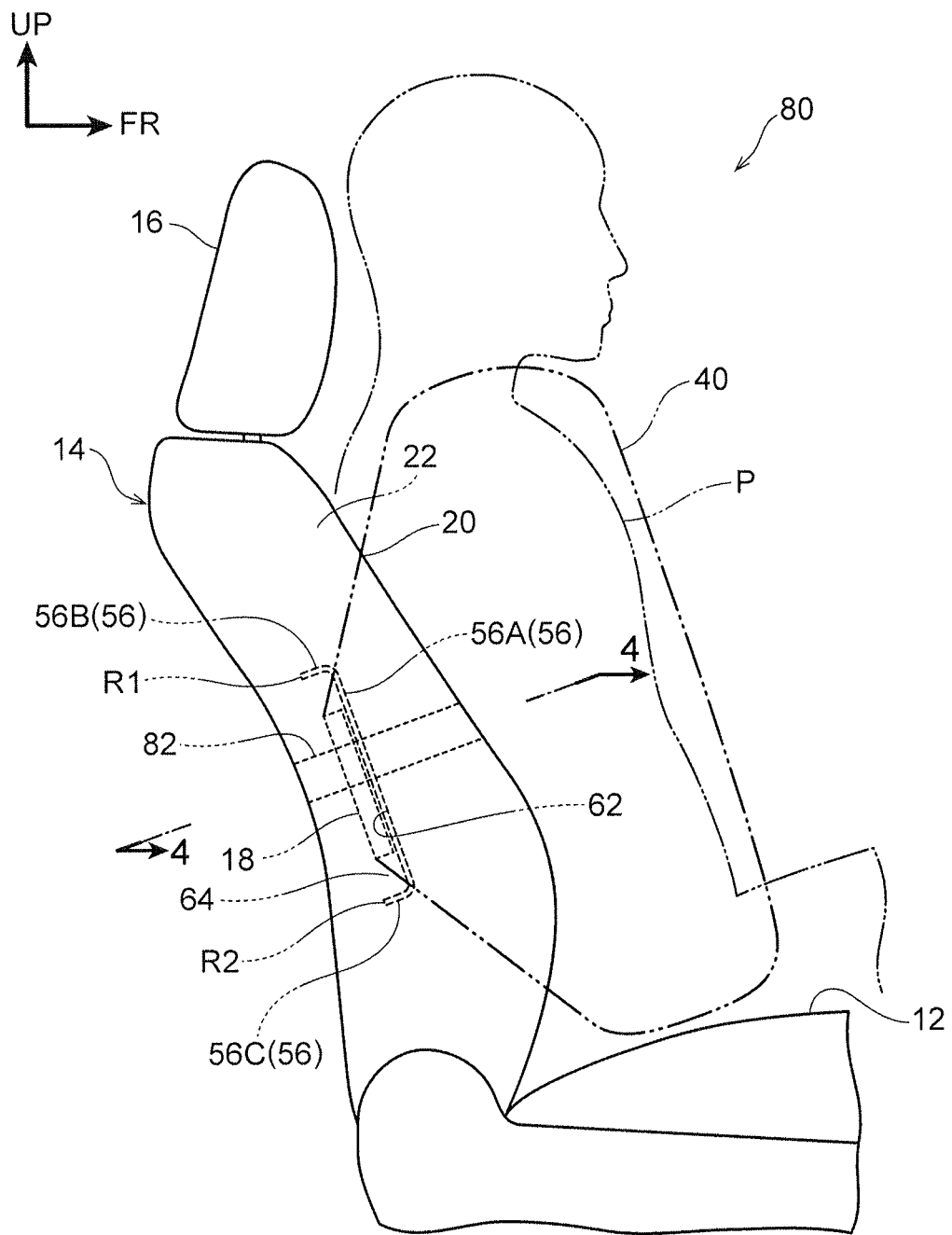
FIG. 5 is a side view corresponding to FIG. 2, illustrating a vehicle seat according to the second exemplary embodiment.

Explanation follows regarding a vehicle seat according to a second exemplary embodiment of the present invention, with reference to FIG. 4 and FIG. 5. Note that members and portions matching those of the vehicle seat 10 according to the first exemplary embodiment are allocated the same reference numerals as in the first exemplary embodiment, and explanation thereof is omitted.

As illustrated in FIG. 4, in a vehicle seat 80 of the present exemplary embodiment, belt shaped reinforcement sheets (reinforcement cloths) 82, 84 are attached to the covering material 20. Specifically, a first reinforcement sheet 84 and a second reinforcement sheet 82 are formed from a material with a greater tensile strength than the covering material 20, and the first reinforcement sheet 84 and the second reinforcement sheet 82 extend along faces on the seatback pad 22 side of the side support section cover 70 and the sidepiece side cover 72. The first reinforcement sheet 84 and the second reinforcement sheet 82 are stitched to the side support section cover 70 and the sidepiece side cover 72 as appropriate. The first reinforcement sheet 84 and the second reinforcement sheet 82 are also stitched to one another at the splitting stitched portion B. At the stitching location A, the first reinforcement sheet 84 is stitched to the main section cover 68 and the side support section cover 70 in a state in which the one end of the coupling member 74 is interposed between the main section cover 68 and the side support section cover 70.

As illustrated in FIG. 5, the second reinforcement sheet 82 and the first slit 56A are disposed overlapping each other in the seat width direction as viewed from the side of the seat.

In the vehicle seat 80 of the present exemplary embodiment described above, the seatback pad 22 and the covering material 20 (the side support section cover 70 and the sidepiece side cover 72) are pressed by the inflating bag body 40. When this occurs, the side support section cover 70 is pushed toward the vehicle front side and attempts to stretch. However, in the present exemplary embodiment, the first reinforcement sheet 84 is stitched to the main section cover 68 and the side support section cover 70 at the stitching location A, and moreover, the stitching location A is coupled to the insert wire 76 insert molded to the seatback pad 22 through the coupling member 74 and the hog rings 78. Accordingly, stress concentrates at the splitting stitched portion B, such that the splitting stitched portion B can be made to split originating at the location where stress has concentrated. Namely, the vehicle seat 80 enables early deployment of the bag body 40.

Figure 6:
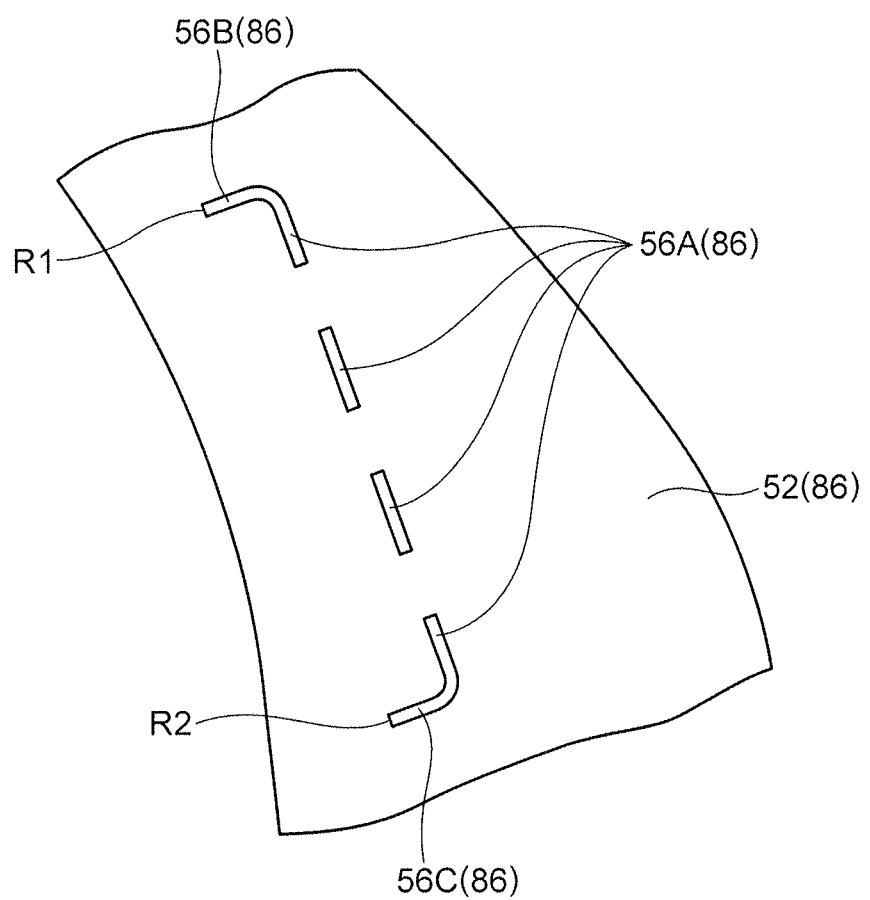
FIG. 6 is a side view illustrating a slit according to a modified example

Note that in the first exemplary embodiment and the second exemplary embodiment, explanation has been given regarding examples in which the seatback pad 22 is provided with the continuous slit 56 in a substantially U-shape (a shape forming three sides of a rectangle). However, the present invention is not limited thereto, and as illustrated in FIG. 6, for example, the seatback pad 22 may be provided with a slit 86 in which the first slit 56A is formed in a dashed line shape as viewed from the side of the seat.

Explanation has been given above regarding exemplary embodiments of the present invention; however, the present invention is not limited to the above description, and obviously various other modifications may be implemented with a range not departing from the spirit of the present invention.

The invention claimed is:

1. A vehicle seat comprising:
   a side airbag device that includes an inflator and a bag body that inflates in a case in which the bag body is internally supplied with gas generated by the inflator;
   a side frame that is provided extending in a seat up-down direction at a seat width direction outside end portion inside a seatback, and that includes an attached-to portion to which the side airbag device is attached; and
   a seatback pad that covers the side airbag device attached to the attached-to portion from a seat front side, a seat width direction outside, and a seat rear side, and that includes an opening through which the inflating bag body passes, a door that closes off the opening and that is pushed and swung by the inflating bag body so as to open up the opening, and a weakened portion formed along the door on a swing axis side of the door; and
   a sheet shaped member that is formed in a sheet shape and is formed harder than the seatback pad, that is attached to a seat inside face of the seatback pad on the seat rear side of a location where the door is provided, and that has a door side end disposed at a part where the weakened portion is formed.

2. The vehicle seat of claim 1, wherein:
   the seatback pad includes
      a side support section projecting out toward the seat front side at a seat front side of the side airbag device that is attached to the attached-to portion,
      a side wall section extending from a seat width direction end portion of the side support section toward the seat rear side, and
      a rear wall section extending from a seat rear side end portion of the side wall section toward the seat width direction inside at the seat rear side of the side airbag device;
   a slit forming an inner edge of the opening and forming an outer edge of the door is formed at the side wall section; and
   the weakened portion is formed at a boundary between the side wall section and the rear wall section.

3. The vehicle seat of claim 2, wherein:
   the slit is configured to include
      a first slit extending in the seat up-down direction,
      a second slit extending from a seat upper side end of the first slit toward the seat rear side, and
      a third slit extending from a seat lower side end of the first slit toward the seat rear side; and
      a seat rear side end of the second slit and a seat rear side end of the third slit are positioned at the boundary between the side wall section and the rear wall section.

4. The vehicle seat of claim 3, wherein the position of the second slit and the position of the third slit are respectively positioned further to the seat upper side and further to the seat lower side than the side airbag device as viewed from a side of the seat.

5. The vehicle seat of claim 3, wherein:
   the rear wall section includes
      an oblique portion extending in the seat width direction at the seat rear side of the side airbag device, and
      a leading end portion extending from a seat width direction inside end portion of the oblique portion along a seat rear side end portion of the side frame, and
   the sheet shaped member is attached to a face at a seat inside of the oblique portion and of the leading end portion.

6. The vehicle seat of claim 5, wherein:
   the side airbag device is configured including a base that supports the inflator and the bag body; and
   a seat width direction inside end portion of the sheet shaped member abuts the side frame, and a seat width direction outside end portion of the sheet shaped member abuts the base.

7. The vehicle seat claim 1, wherein:
   a seat up-down direction dimension of the opening is set larger than a seat up-down direction dimension of the side airbag device attached to the attached-to portion; and
   an upper edge and a lower edge of the opening are respectively positioned further to the seat upper side and further to the seat lower side than the side airbag device attached to the attached-to portion.

8. The vehicle seat of claim 1, wherein, as viewed from a side of the seat, a front edge of the opening is at the same position as a front end of the bag body in a stowed state of the bag body, or is positioned further to the seat front side than the front end of the bag body in the stowed state.

9. The vehicle seat of claim 2, wherein a hardness of the side support section is set higher than a hardness of the side wall section.

10. The vehicle seat of claim 1, wherein:
    the seatback pad is covered by a covering material;
    the covering material is provided with a splitting stitched portion that splits in a case in which the covering material is pressed by the inflating bag body;
    a reinforcement sheet with a greater tensile strength than the covering material is attached to the covering material in a state straddling a portion of the splitting stitched portion; and
    one end of the reinforcement sheet is fixed to the seatback pad.

11. The vehicle seat of claim 10, wherein:
    the covering material is configured to include
       a main section cover that covers a main section configuring part of the seatback pad and disposed between the side support sections respectively disposed at each seat width direction end portion of the seatback pad,
       a side support section cover that covers a seat front side face of the side support section, and
       a sidepiece side cover that covers from a seat width direction outside face of the side support section to outside portions of the side wall section and the rear wall section;
    the splitting stitched portion is disposed at a location where the side support section cover and the sidepiece side cover are stitched together;

the reinforcement sheet is configured by a first reinforcement sheet and a second reinforcement sheet that are respectively stitched to the side support section cover and the sidepiece side cover in a state extending along a face on the seatback pad side of each of the side support section cover and the sidepiece side cover, and the first reinforcement sheet and the second reinforcement sheet are stitched together at the splitting stitched portion; and the first reinforcement sheet is stitched to the main section cover and the side support section cover in a state in which one end of a coupling member coupled to the seatback pad is interposed between the main section cover and the side support section cover.

12. The vehicle seat of claim 10, wherein the slit is configured to include a first slit extending in the seat up-down direction, a second slit extending from a seat upper side end of the first slit toward the seat rear side, and a third slit extending from a seat lower side end of the first slit toward the seat rear side; and a seat rear side end of the second slit and a seat rear side end of the third slit are positioned at the boundary between the side wall section and the rear wall section, and wherein the reinforcement sheet and the first slit are disposed overlapping with each other in the seat width direction as viewed from the side of the seat.

13. The vehicle seat of claim 11, wherein a location where the main section cover and the side support section cover are stitched together is coupled through the coupling member and a hog ring to an insert wire insert molded to the seatback pad.

* * * * *